| United States Patent [19] | [11] Patent Number: 5,011,547 |
| Fujimoto et al. | [45] Date of Patent: Apr. 30, 1991 |

[54] ALUMINUM ALLOY COMPOSITE MATERIAL FOR BRAZING

[75] Inventors: Hideo Fujimoto, Ninomiya; Masakazu Hirano, Utsunomiya; Mituo Hashiura; Toshiaki Murao, both of Kariya, all of Japan

[73] Assignees: Kabushiki Kaisha Kobe Seiko Sho, Kobe; Nippondenso Company, Ltd., Kariya, both of Japan

[21] Appl. No.: 405,292

[22] Filed: Sep. 11, 1989

[30] Foreign Application Priority Data

Sep. 12, 1988 [JP] Japan ................... 63-229679
Aug. 11, 1989 [JP] Japan ................... 1-208716

[51] Int. Cl.$^5$ .................................... B23K 35/34
[52] U.S. Cl. .................................... 148/24
[58] Field of Search ..................... 148/23–26

[56] References Cited

U.S. PATENT DOCUMENTS 3,321,828  5/1967  Miller ................... 148/24

*Primary Examiner*—Peter D. Rosenberg
*Attorney, Agent, or Firm*—Oblon, Spivak, McClelland, Maier & Neustadt

[57] ABSTRACT

An aluminum alloy composite material for brazing has a core member made of an aluminum alloy, Al-Si filler member and a cladding member made of an aluminum alloy. Mg contained in the aluminum alloy of the core member is restricted to within 0.2% or less by weight. The aluminum alloy of the cladding member essentially consists of 0.3% to 2.5% by weight of Mg. During brazing, the core member serves to restrain the diffusion of Si from the filler member clad on one surface of the core member and the diffusion of Mg from the cladding member clad on the opposite surface of the core member.

12 Claims, 1 Drawing Sheet

ALUMINUM ALLOY COMPOSITE MATERIAL FOR BRAZING

BACKGROUND OF THE INVENTION

The present invention relates to an aluminum alloy composite material for brazing, which is improved in strength, corrosion resistance and brazability, and which provides remarkable advantages when used for a tube member of a radiator assembled by the Nocolok brazing method.

Aluminum alloy composite materials for brazing are used for a tube member of a brazed radiator, etc., and conventionally, brazing sheets comprising Al-Mn alloy A3003 as a core member and an Al-Si filler member clad on the core member are used for this purpose.

The brazing sheet with the A3003 core member, however, has a post-brazing strength of not greater than 2 kgf/mm$^2$ or thereabouts and is not sufficiently resistant to corrosion.

If Mg is added to the alloy of the core member, the strength of the composite material can be improved, but this modification results in an increased erosion of the core member due to the filler member and also in a reduction in brazability and corrosion resistance. In the case of the Nocolok brazing method, which is widely used, a Mg content in the core member in excess in 0.2% entails a substantial drop in brazability, and accordingly, addition of Mg to the core alloy must be restricted.

Thus, with conventional techniques, it is difficult to obtain an aluminum alloy composite material for brazing which has high strength and high corrosion resistance and yet is excellent in brazability. As for heat exchangers such as an automobile radiator, thin materials are needed to reduce the weight and cost, and accordingly, there is a demand for an aluminum alloy composite material which has high strength and high corrosion resistance and is excellent in brazability, but no such material has been developed yet.

SUMMARY OF THE INVENTION

The object of the present invention is to provide an aluminum alloy composite material for brazing, which provides high strength, high corrosion resistance and excellent brazability, without being lowered by the Nocolok brazing process, and which is suitable for assembling a high-strength heat exchanger.

To achieve the above object, the present inventors have made studies on members for brazing which have a smaller amount of Mg in the core member but have high strength without a reduction in brazability and corrosion resistance.

As a result of intensive studies, the present invention is accomplished as follows.

An aluminum alloy composite material for brazing according to the present invention has a core member of aluminum alloy, the content of Mg being restricted to 0.2% or less, preferably 0.1% or less, by weight as an impurity, an Al-Si filler member clad on one surface of the core member, and a cladding member of aluminum alloy essentially consisting of 0.3% to 2.5% by weight of Mg and clad on an opposite surface of the core member.

The present invention provides a high-strength aluminum alloy composite material which is not lowered in brazability or corrosion resistance by the Nocolok brazing method. Accordingly, when the high-strength aluminum alloy composite material of the present invention is used for assembling a heat exchanger of a motor vehicle, it provides remarkable effects such as a reduction in thickness and weight of the heat exchanger, reduction in the cost, etc.

DETAILED DESCRIPTION OF THE PREFERRED EMBODIMENTS

The present invention will be described in more detail hereinafter.

Figure 1:
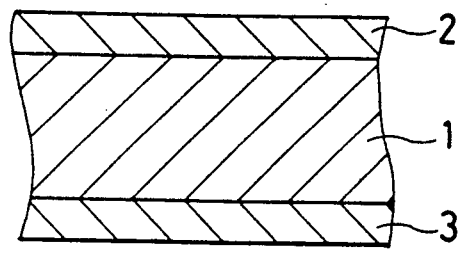
FIG. 1 is a view showing a structure of an example of an aluminum alloy composite material for brazing, according to the present invention.

The structure of the aluminum alloy composite material for brazing according to the invention is such that, as shown in FIG. 1, the aluminum alloy core member 1, the content of Mg being restricted to 0.2% or less, preferably 0.1% or less, by weight as an impurity contacts the Al-Si filler member 2, and the aluminum alloy cladding member 3 essentially consisting of a predetermined amount (0.3% to 2.5% by weight) of Mg is clad on the opposite surface of the core member 1.

The aluminum alloy composite material with the above structure has the following characteristics and thus achieves the intended effects.

The brazability of the composite material is never lowered since the Mg content of the core member 1 is restricted to a low value. Further, during brazing with heat, Si in the filler member 2 diffuses into the core member 1, while Mg diffuses into the core member 1 from the cladding member 3 on the side opposite to the filler member 2, whereby MgSi is produced in the core region, thus increasing the post-brazing strength.

In this case, the region of the core member 1 contacting the filler member 2 has the lowest Mg content since the other regions are supplied with diffused Mg from the cladding member 3 clad on the opposite side of the core member 1, whereby the strength can be improved without a reduction in the brazability. On the other hand, the surface of the cladding member 3 at the opposite side has the highest Mg content and the lowest Si content, and accordingly, the corrosion resistance is hardly lowered. The strength, corrosion resistance and brazability can be further improved by adding a suitable amount of Mn to the alloy of the core member 1, and the strength can be still further increased by adding a suitable amount of Si to the alloy of the core member 1. Furthermore, substantially the same effects as obtained with Mn can be achieved by adding suitable amounts of Cu, Cr, Zr and the like, and the strength can be improved if Mg is contained in the restricted range.

For the cladding member 3 clad on the opposite surface of the core member 1, an Al alloy containing Mg is used, which can function as a sacrificial anode when used for the radiator tube, thereby remarkably increasing corrosion resistance. By adding a suitable amount of Zn to the cladding member 3, the function of the sacrificial anode can further be improved.

Thus, during brazing, the core member 1 serves to restrain the diffusion of Si from the filler member 2 clad on one surface of the core member 1 and the diffusion of Mg from the cladding member 3 clad on the opposite surface of the core member 1.

The aluminum alloy composite material according to the invention has the above-mentioned effects. Now, the definition of the contents of the individual elements will be described.

Core Member

The allowable amount of Mg contained in the aluminum alloy core member 1 as an impurity before brazing is defined as 0.2% at the maximum, preferably 0.1% or less, both by weight, to avoid the brazability being lowered. If the Mg content is greater than the allowable value, the brazability is unfavorably lowered especially during a brazing process by a Nocolok brazing method.

As long as the Mg content is within the above range, the composition of the aluminum alloy for the core member 1 is not limited in particular. If no Si is to be added, the Mg content is preferably 0.1% or less by weight.

By adding Mn, for example, to the aluminum alloy core member 1, the corrosion resistance, brazability, and strength can be improved. A preferable amount of Mn is 0.2% to 1.5% by weight. If the Mn content is less than 0.2%, the above advantages are not fully achieved, and if the Mn content is greater than 1.5%, large compounds are undesirably produced and thus the workability is lowered.

Similarly, by adding at least one element selected from Cu, Cr, Zr and the like as needed, the strength, corrosion resistance and brazability can be further improved. In the case of using the cladding member 3 as the sacrificial anode, addition of these elements to the core member 1 is effective. Preferable amounts of Cu, Cr and Zr are 0.5% or less, 0.3% or less, and 0.2% or less, respectively, all by weight. Addition of the elements in excess of their respective upper limits leads to saturation of the aforesaid effects and a decrease in workability.

Further, by adding Si to the core member 1, it is possible to improve the strength even if the supply of Si from the filler member 2 is insufficient. A preferable amount of Si to be added is 0.3% to 1.3% by weight. If the amount of Si is smaller than 0.3%, the strength is not sufficiently improved, and if the amount of Si is greater than 1.3%, a disadvantage arises because the melting point is lowered. In the case of adding Si, the Mg content can be increased up to 0.2%.

Of course, both Mn and Si may be added, and in addition, at least one element selected from Cu, Cr, Zr, etc., may further be added as needed.

The core member 1 serves to restrict not only the diffusion of Si from the filler member 2 but the diffusion of Mg from the cladding member 3 clad at the opposite side during brazing. The thickness of the core member 1 is set to an optimum value such that the above-mentioned effects are achieved and the strength is the maximum, and preferably is 2.5 times or more the thickness of the filler member 2 and in the range of 0.1 to 1 mm.

Cladding Member

For the cladding member 3 clad on the surface of the core member 1 at the opposite side of the filler member 2, an aluminum alloy containing Mg is used, which can function as a sacrificial electrode when the composite material is used for a radiator tube etc., thereby remarkably increasing the corrosion resistance. The Mg concentration at the interface between the core member 1 and the filler member 2 after brazing is preferably about 0.1% to 0.02% by weight, and to obtain such Mg concentration, the Mg content of the cladding member 3 should be in the range of 0.3% to 2.5%, though the concentration depends on the thickness of the member 3, the brazing conditions, etc. If the Mg content is less than 0.3%, the improvement in strength is insufficient, and if the Mg content is greater than 2.5%, then it is difficult to have the cladding member 3 clad on the core member 1. If a composite material with an increased thickness is to be manufactured, Mn, Cu, Cr, Zr, etc. may be added to the cladding member 3 to improve the strength. The amounts of these elements to be added are the same as in the case of adding the elements to the alloy of the core member 1.

When the cladding member 3 is to be used as a sacrificial anode, it is effective to add elements with positive potential, e.g., Mn, Cu, Cr, etc., to the core member 1; in addition, to increase anodical potential of the cladding member 3, Zn may be added to the cladding member 3. Preferably, the amount of Zn to be added is 2% or less by weight, and if the cladding member 3 contains more Zn, a disadvantage can be caused in that the furnace is contaminated during brazing.

Filler Member

For the filler member, an Al-Si alloy is used as in the prior art. For example, the A4343 alloy, the A4004 alloy or the like may be used.

Other Conditions

As for the thickness of the composite material, 0.4 mm or thereabouts is enough when the material is used for the tube member of a radiator, because the strength is sufficiently increased by the diffusion of Mg from the cladding member 3 clad on the side of the core member 1 which is opposite to the filler member 2.

The present invention is the most effective when applied to the Nocolok brazing method which can extremely degrade the brazability due to Mg, but, of course, it can be applied to other brazing methods such as atmosphere brazing, flux brazing, vacuum brazing, etc.

Figure 2:
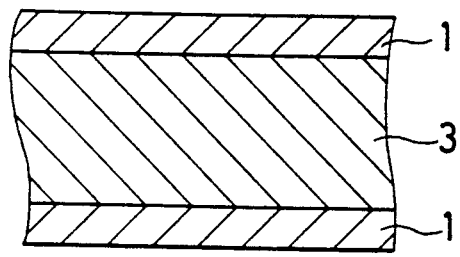
FIGS. 2 and 3 are views showing structures of other examples of aluminum alloy composite materials, according to the invention.
Figure 3:
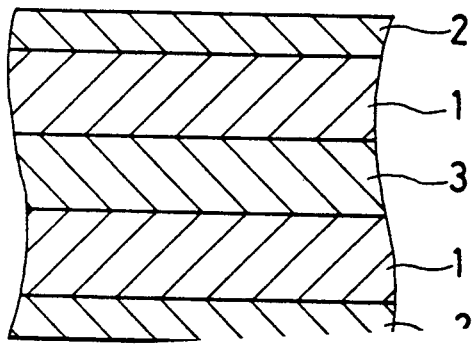

If aluminum alloy core members 1 containing 0.3% to 1.3% by weight of Si and no Mg are clad on both surfaces of an aluminum alloy cladding member 3 containing Mg, as shown in FIG. 2, an aluminum alloy composite material with no brazing layer can be obtained. Similarly, if, as shown in FIG. 3, aluminum alloy core members 1 containing no Mg are clad on both surfaces of an aluminum alloy cladding member 3 containing Mg and Al-Si filler members 2 are clad on both surfaces of the resultant structure, then a brazing sheet with filler members on both surfaces thereof can be obtained.

In assembling a radiator tube, the composite material is worked into a tube by a suitable process, e.g., by seam welding, with the aforesaid filler member 2 outside.

For the improvement of the corrosion resistance of the inner surface of the radiator tube, the most effective measure is to use the cladding member 3 as a sacrificial anode for the core member 1. Since the Nocolok brazing method is carried out under atmospheric pressure, Zn scarcely vaporizes but diffuses into the core member 1 by the brazing heat, thus decreasing the surface concentration. To greatly improve the corrosion resistance of the inner surface (coolant-side surface) of the radiator tube by the sacrificial anode effect of the cladding member 3, the difference of pitting potential between the surface of the cladding member 3 and the core member 1 need be not smaller than 30 mV. However, if the difference of the pitting potential is greater than 120 mV, the speed of consumption of the cladding member 3 is great and thus the sacrificial anode effect cannot be maintained for a long period of time. The difference of the pitting potential varies depending on the composition of the cladding member 3 and core member 1, and the brazing conditions, but if the pitting potential difference after the Nocolok brazing is within the range of 30 to 120 mV, excellent corrosion resistance can be enjoyed for a long time.

Examples of the present invention will now be described.

For Examples 1 to 4, aluminum alloys (core member, cladding member and filler member) having the chemical compositions shown in Table 1 were prepared.

In Table 1, No. 1 to No. 10 alloys were used for the core member, No. 11 to No. 22 alloys for the cladding member, and No. 23 and No. 24 alloys for the filler member.

The No. 7 alloy contained 0.2% Mg by weight but not Si, and the No. 8 and No. 10 alloys contained a larger amount of Si and Cu, respectively. These alloys were used as controls.

The No. 23 filler member was the A4343 alloy which is used for the Nocolok brazing process, atmosphere brazing, and flux brazing, and the No. 24 filler member was the A4004 alloy which is used for the vacuum brazing.

These aluminum alloys were combined as shown in Tables 2 and 3, to produce samples of aluminum alloy composite materials for brazing having the structure shown in FIG. 1.

EXAMPLE 1

Among the combinations of alloys listed in Tables 2 and 3, those aluminum alloy composite materials using the No. 23 filler member were applied with 5 g/m² Nocolok brazing flux on the filler member thereof, dried, and then heated at 600° C. for 5 minutes in a nitrogen gas atmosphere having a dew point of −40° C. The aluminum alloy composite materials using the No. 24 filler member were heated at 595 C. for 3 minutes in a vacuum of $5 \times 10^{-5}$ Torr.

The brazability of the samples, evaluated in terms of flow factor, is shown in Tables 4 and 5.

As is clear from the tables, the examples according to the present invention have improved brazability, particularly when applied to the Nocolok brazing method.

EXAMPLE 2

The aluminum alloy composite materials heated under the same conditions as in Example 1 were left to stand for 7 days in room temperature, and then subjected to a tensile test. As seen from Tables 4 and 5 showing the results, the examples according to the invention had high strength after brazing well over 12 kgf/mm².

EXAMPLE 3

The aluminum alloy composite materials heated under the same conditions as in Example 1 were subjected to a CASS test to evaluate the corrosion resistance of the filler member side of the composite material. The evaluation results after the CASS test for 250 hours are shown in Tables 4 and 5. As indicated in the tables under the caption "Corrosion Resistance of Filler Member Side", the examples according to the invention had excellent corrosion resistance.

EXAMPLE 4

The aluminum alloy composite materials heated under the same conditions as in Example 1 were subjected to an immersion test by immersing the composite materials in artificial water (Cl⁻: 300 ppm; $SO_4^{-2}$: 100 ppm; Cu: 5 ppm) for 30 days under alternate temperature conditions of 88° C. for 8 hours and room temperature for 16 hours, to evaluate the corrosion resistance of the cladding member clad on the side opposite to the filler member side of the composite material. The results of the immersion test are shown in Tables 4 and 5. As shown in the tables under the caption "Corrosion Resistance of Cladding Member Side", the examples according to the invention had excellent corrosion resistance.

From Examples 1 to 4, it is evident that the examples according to the invention have high strength without a reduction in brazability or corrosion resistance.

TABLE 1

| Alloy No. | Chemical Composition (% by weight) | | | | | | | | |
|---|---|---|---|---|---|---|---|---|---|
| | Si | Cu | Mn | Mg | Cr | Zr | Zn | | |
| 1 | — | 0.15 | 1.10 | 0.00 | — | — | — | core member | Example |
| 2 | — | 0.40 | 0.80 | 0.00 | — | — | — | | |
| 3 | — | 0.30 | 0.75 | 0.05 | 0.10 | 0.10 | — | | |
| 4 | — | 0.50 | 0.30 | 0.00 | 0.10 | 0.00 | — | | |
| 5 | 0.50 | 0.00 | 1.00 | 0.00 | 0.25 | 0.00 | — | | |
| 6 | 1.00 | 0.15 | 1.00 | 0.00 | 0.00 | 0.15 | — | | |
| 7 | — | 0.15 | 1.10 | 0.20 | — | — | — | | Control |
| 8 | 0.35 | 0.30 | 0.00 | 0.60 | — | — | — | | |
| 9 | 1.80 | 0.00 | 1.00 | — | — | — | — | | |
| 10 | — | 0.60 | 1.00 | 0.00 | — | 0.30 | — | | |
| 11 | — | — | — | 0.50 | — | — | — | cladding member | Example |
| 12 | — | — | — | 1.50 | — | — | — | | |
| 13 | — | — | — | 2.50 | — | — | — | | |
| 14 | — | — | — | 2.00 | — | — | 0.80 | | |
| 15 | — | — | — | 1.50 | — | — | 1.50 | | |
| 16 | — | — | 0.30 | 1.50 | — | — | — | | |
| 17 | — | — | 1.00 | 1.00 | — | — | — | | |
| 18 | — | 0.15 | 1.00 | 1.50 | — | 0.10 | — | | |
| 19 | — | 0.50 | 0.30 | 1.50 | 0.10 | 0.10 | — | | |
| 20 | — | — | — | 0.00 | — | — | — | | Control |
| 21 | — | — | — | 3.00 | — | — | — | | |
| 22 | — | 1.00 | 1.00 | 1.50 | — | — | — | | |
| 23 | 7.5 | — | — | — | — | — | — | filler member | Example |

TABLE 1-continued

| Alloy No. | Chemical Composition (% by weight) | | | | | | | |
|---|---|---|---|---|---|---|---|---|
| | Si | Cu | Mn | Mg | Cr | Zr | Zn | |
| 24 | 9.5 | — | — | 1.50 | — | — | — | (A4343) filler member (A4004) |

TABLE 2

| Test No. | Core Member | | Cladding Member | | Filler Member | | Thickness Of Sheet (mm) | Brazing Method | |
|---|---|---|---|---|---|---|---|---|---|
| | Alloy No. | Thickness (mm) | Alloy No. | Thickness (mm) | Alloy No. | Thickness (mm) | | | |
| 31 | 1 | 0.32 | 12 | 0.04 | 23 | 0.04 | 0.40 | NB | Example |
| 32 | 2 | 0.32 | 12 | 0.04 | 23 | 0.04 | 0.40 | NB | |
| 33 | 3 | 0.32 | 12 | 0.04 | 23 | 0.04 | 0.40 | NB | |
| 34 | 4 | 0.32 | 12 | 0.04 | 23 | 0.04 | 0.40 | NB | |
| 35 | 5 | 0.32 | 12 | 0.04 | 23 | 0.04 | 0.40 | NB | |
| 36 | 6 | 0.32 | 12 | 0.04 | 23 | 0.04 | 0.40 | NB | |
| 37 | 1 | 0.32 | 11 | 0.04 | 23 | 0.04 | 0.40 | NB | |
| 38 | 1 | 0.32 | 13 | 0.04 | 23 | 0.04 | 0.40 | NB | |
| 39 | 1 | 0.32 | 14 | 0.04 | 23 | 0.04 | 0.40 | NB | |
| 40 | 3 | 0.32 | 15 | 0.04 | 23 | 0.04 | 0.40 | NB | |
| 41 | 7 | 0.32 | 12 | 0.04 | 23 | 0.04 | 0.40 | NB | Control |
| 42 | 8 | 0.32 | 12 | 0.04 | 23 | 0.04 | 0.40 | NB | |
| 43 | 9 | 0.32 | 12 | 0.04 | 23 | 0.04 | 0.40 | NB | |
| 44 | 10 | 0.32 | 12 | 0.04 | 23 | 0.04 | 0.40 | NB | |
| 45 | 2 | 0.32 | 20 | 0.04 | 23 | 0.04 | 0.40 | NB | |
| 46 | 2 | 0.32 | 21 | 0.04 | 23 | 0.04 | 0.40 | NB | |
| 47 | 2 | 0.32 | 22 | 0.04 | 23 | 0.04 | 0.40 | NB | |

NB; Nocolok Brazing Method

TABLE 3

| Test No. | Core Member | | Cladding Member | | Filler Member | | Thickness Of Sheet (mm) | Brazing Method | |
|---|---|---|---|---|---|---|---|---|---|
| | Alloy No. | Thickness (mm) | Alloy No. | Thickness (mm) | Alloy No. | Thickness (mm) | | | |
| 48 | 1 | 0.20 | 16 | 0.30 | 23 | 0.05 | 0.55 | NB | Example |
| 49 | 3 | 0.10 | 19 | 0.25 | 23 | 0.05 | 0.40 | NB | |
| 50 | 3 | 0.70 | 13 | 0.20 | 23 | 0.10 | 1.00 | NB | |
| 51 | 3 | 1.00 | 13 | 0.20 | 23 | 0.20 | 1.40 | NB | |
| 52 | 3 | 0.20 | 17 | 0.25 | 23 | 0.05 | 0.50 | NB | |
| 53 | 3 | 0.20 | 18 | 0.25 | 23 | 0.05 | 0.50 | NB | |
| 54 | 3 | 0.20 | 19 | 0.25 | 23 | 0.05 | 0.50 | NB | |
| 55 | 1 | 0.32 | 12 | 0.04 | 24 | 0.04 | 0.40 | VB | Example |
| 56 | 2 | 0.32 | 12 | 0.04 | 24 | 0.04 | 0.40 | VB | |
| 57 | 3 | 0.32 | 11 | 0.04 | 24 | 0.04 | 0.40 | VB | |
| 58 | 3 | 0.32 | 12 | 0.04 | 24 | 0.04 | 0.40 | VB | |
| 59 | 3 | 0.32 | 15 | 0.04 | 24 | 0.04 | 0.40 | VB | |
| 60 | 3 | 0.08 | 12 | 0.28 | 24 | 0.04 | 0.40 | VB | |
| 61 | 3 | 0.64 | 12 | 0.08 | 24 | 0.08 | 0.80 | VB | Example |
| 62 | 8 | 0.32 | 12 | 0.04 | 24 | 0.05 | 0.40 | VB | Control |
| 63 | 9 | 0.32 | 12 | 0.04 | 24 | 0.05 | 0.40 | VB | |
| 64 | 10 | 0.32 | 12 | 0.04 | 24 | 0.05 | 0.40 | VB | |

NB; Nocolok Brazing Method
VB; Vaccum Brazing Method

TABLE 4

| Test No. | Brazability (Flow Factor %) | Tensile Strength (kgf/mm$^2$) | Corrosion Resistance of Filler Member Side (Corrosion Depth mm) | Corrosion Resistance of Cladding Member Side (Corrosion Depth mm) | Evaluation | |
|---|---|---|---|---|---|---|
| 31 | 68 | 15.5 | 0.30 | 0.06 | O | Example |
| 32 | 65 | 16.0 | 0.25 | 0.06 | O | |
| 33 | 65 | 15.5 | 0.25 | 0.05 | O | |
| 34 | 65 | 15.0 | 0.20 | 0.05 | O | |
| 35 | 70 | 16.0 | 0.30 | 0.07 | O | |
| 36 | 70 | 18.0 | 0.30 | 0.06 | O | |
| 37 | 70 | 14.5 | 0.30 | 0.06 | O | |
| 38 | 65 | 18.0 | 0.30 | 0.05 | O | |
| 39 | 65 | 17.0 | 0.30 | 0.06 | O | |
| 40 | 70 | 16.0 | 0.30 | 0.07 | O | |
| 41 | 40 | 19.0 | 0.4 | 0.15 | X | Control |
| 42 | 15 | 18.0 | 0.4 | 0.20 | X | |
| 43 | 30 | 17.0 | 0.4 | 0.35 | X | |
| 44 | 65 | 18.0 | 0.25 | 0.20 | Δ | |
| 45 | 70 | 12.5 | 0.25 | 0.05 | Δ | |
| 46 | 50 | 17.5 | 0.35 | 0.10 | Δ | |

TABLE 4-continued

| Test No. | Brazability (Flow Factor %) | Tensile Strength (kgf/mm$^2$) | Corrosion Resistance of Filler Member Side (Corrosion Depth mm) | Corrosion Resistance of Cladding Member Side (Corrosion Depth mm) | Evaluation | |
|---|---|---|---|---|---|---|
| 47 | 65 | 18.5 | 0.4 | 0.4 | X | |

*Evaluation
O; Good
Δ;Fair
X; Bad

TABLE 5

| Test No. | Brazability (Flow Factor %) | Tensile Strength (kgf/mm$^2$) | Corrosion Resistance of Filler Member Side (Corrosion Depth mm) | Corrosion Resistance of Cladding Member Side (Corrosion Depth mm) | Evaluation | |
|---|---|---|---|---|---|---|
| 48 | 60 | 16.0 | 0.30 | 0.20 | O | Example |
| 49 | 55 | 21.0 | 0.15 | 0.30 | Δ | |
| 50 | 70 | 16.0 | 0.35 | 0.20 | O | |
| 51 | 70 | 15.0 | 0.30 | 0.25 | O | |
| 52 | 60 | 19.0 | 0.30 | 0.25 | O | |
| 53 | 60 | 20.5 | 0.25 | 0.20 | O | |
| 54 | 60 | 21.0 | 0.30 | 0.25 | O | |
| 55 | 60 | 15.0 | 0.30 | 0.10 | O | |
| 56 | 60 | 17.0 | 0.30 | 0.06 | O | |
| 57 | 55 | 14.5 | 0.30 | 0.08 | O | |
| 58 | 55 | 15.0 | 0.30 | 0.10 | O | |
| 59 | 60 | 15.0 | 0.30 | 0.05 | O | |
| 60 | 50 | 17.0 | 0.30 | 0.25 | O | |
| 61 | 60 | 15.0 | 0.30 | 0.10 | O | |
| 62 | 40 | 17.0 | 0.4 | 0.25 | X | Control |
| 63 | 55 | 19.0 | 0.4 | 0.06 | X | |
| 64 | 60 | 19.5 | 0.25 | 0.20 | Δ | |

*Evaluation
O; Good
Δ; Fair
X; Bad

EXAMPLE 5

Aluminum alloys having the chemical compositions shown in Table 6 were prepared by a conventional procedure. The No. 20 alloy is the A4343 alloy which is used for the Nocolok brazing method, atmosphere brazing method, and flux brazing method.

These alloys were combined as shown in Table 7, to fabricate radiator tubes by the same procedures as in Examples 1 to 4.

Each of these tube materials was applied with 5 g/m$^2$ Nocolok brazing method flux on the filler member-side surface thereof, dried, and heated at 600° C. for 5 minutes in a nitrogen gas atmosphere, the dew point of which is −40° C.

The results of evaluation as to the brazability, strength, and corrosion resistance (filler member-side and cladding member-side ) are shown in Table 8. The evaluation method used is the same as that for Examples 1 to 4.

After the test of the cladding member-side corrosion resistance, reduction in weight of the cladding members was measured, the results of the measurement being also shown in Table 8.

As is clear from Table 8, the examples according to the invention are excellent in brazability, strength, and corrosion resistance.

The reduction of weight mentioned above is a parameter representing the consumption speed of the clad layer. Apparently, the examples of the invention show smaller reduction of weight and thus lower consumption speed.

EXAMPLE 6

Using the radiator tube materials heated under the same conditions as in Example 5, the pitting potential of the surface of the cladding member and the pitting potential of the core member which was exposed by mechanically removing the cladding member with emery grinding paper were measured under the following conditions.

Measuring Conditions:

Electrolyte: 3.5% NaCl, deaerated by blowing an N$_2$ gas

Temperature: 25° C.

Measuring Method: Potential scanning by using a potentiostat (sweep speed: 10 mV/min)

The measured differences of pitting potential between the core member and the cladding member are shown in Table 8.

As shown in Table 8, the differences of pitting potential between the core member and cladding member of the examples according to the invention fall within the range of 30 to 120 mV, and this means that the corrosion resistance of the inner surface of the radiator tube can be maintained for a long period of time.

TABLE 6

| Alloy No. | | Chemical Composition (% by weight) | | | | | | | |
|---|---|---|---|---|---|---|---|---|---|
| | | Si | Cu | Mn | Mg | Cr | Zr | Zn | |
| 1 | Core Member | 0.50 | 0.00 | 1.00 | — | 0.25 | — | — | Example |
| 2 | | 1.00 | 0.15 | 1.00 | 0.05 | 0.00 | 0.15 | — | |
| 3 | | 0.85 | 0.30 | 0.75 | 0.20 | 0.10 | 0.10 | — | |

TABLE 6-continued

| Alloy No. | | Chemical Composition (% by weight) | | | | | | | |
|---|---|---|---|---|---|---|---|---|---|
| | | Si | Cu | Mn | Mg | Cr | Zr | Zn | |
| 4 | | 0.35 | 0.30 | — | 0.60 | — | — | — | Control |
| 5 | | 1.80 | 0.00 | 1.00 | — | — | — | — | |
| 6 | | — | 0.60 | 1.00 | — | — | 0.30 | — | |
| 11 | Cladding Member | — | — | — | 0.50 | — | — | — | Example |
| 12 | | — | — | — | 1.50 | — | — | — | |
| 13 | | — | — | — | 2.50 | — | — | — | |
| 14 | | — | — | — | 2.00 | — | — | 0.80 | |
| 15 | | — | — | — | 1.50 | — | — | 1.50 | |
| 16 | | 99.7% by weight of purity of aluminum | | | | | | | Control |
| 17 | | — | — | — | — | — | — | 1.50 | |
| 18 | | — | 0.15 | 0.10 | — | — | — | — | |
| 19 | | — | — | — | 4.0 | — | — | — | |
| 20 | Filler Member | 7.5 | — | — | — | — | — | — | Example (A4343 alloy) |
| 21 | | 10.0 | — | — | — | — | — | — | Example |

TABLE 7

| Test No. | Core Member | | Cladding Member | | Filler Member | | Thickness Of Sheet (mm) | Brazing Method | |
|---|---|---|---|---|---|---|---|---|---|
| | Alloy No. | Thickness (mm) | Alloy No. | Thickness (mm) | Alloy No. | Thickness (mm) | | | |
| 31 | 1 | 0.32 | 12 | 0.04 | 21 | 0.04 | 0.40 | NB | Example |
| 32 | 2 | ↑ | ↑ | ↑ | ↑ | ↑ | ↑ | ↑ | |
| 33 | 4 | ↑ | 14 | ↑ | 20 | ↑ | ↑ | ↑ | Control |
| 34 | 4 | ↑ | 17 | ↑ | ↑ | ↑ | ↑ | ↑ | |
| 35 | 5 | ↑ | 18 | ↑ | ↑ | ↑ | ↑ | ↑ | |
| 36 | 6 | ↑ | 19 | ↑ | ↑ | ↑ | ↑ | ↑ | |
| 37 | 3 | ↑ | 11 | ↑ | ↑ | ↑ | ↑ | ↑ | Example |
| 38 | 2 | ↑ | 12 | ↑ | ↑ | ↑ | ↑ | ↑ | |
| 39 | 2 | ↑ | 13 | ↑ | ↑ | ↑ | ↑ | ↑ | |
| 40 | 3 | ↑ | 14 | ↑ | ↑ | ↑ | ↑ | ↑ | |
| 41 | 3 | ↑ | 15 | ↑ | ↑ | ↑ | ↑ | ↑ | |
| 42 | 2 | ↑ | 16 | ↑ | ↑ | ↑ | ↑ | ↑ | Control |
| 43 | 6 | ↑ | 15 | ↑ | ↑ | ↑ | ↑ | ↑ | |

NB; Nocolok Brazing Method

TABLE 8

| Test No. | Brazability (Flow Factor %) | Tensile Strength (kgf/mm²) | Corrosion Resistance of Brazing Member Side (Corrosion Depth mm) | Corrosion Resistance of Cladding Member Side | | Difference of Pitting Potential (mV) | Evaluation | |
|---|---|---|---|---|---|---|---|---|
| | | | | Corrosion Depth (mm) | Reduction of weight (mg/dm²) | | | |
| 31 | 70 | 16.0 | 0.30 | 0.07 | 12 | 35 | O | Example |
| 32 | 70 | 18.0 | 0.30 | 0.06 | 10 | 45 | O | |
| 33 | 15 | 17.0 | 0.40 | 0.15 | 16 | 60 | Δ | Control |
| 34 | 15 | 15.0 | 0.40 | 0.20 | 25 | 80 | Δ | |
| 35 | 30 | 16.0 | 0.40 | 0.40 | 15 | 15 | X | |
| 36 | 65 | 15.5 | 0.25 | 0.30 | 18 | 75 | Δ | |
| 37 | 70 | 16.5 | 0.25 | 0.10 | 10 | 45 | O | Example |
| 38 | 65 | 17.0 | 0.25 | 0.10 | 8 | 45 | O | |
| 39 | 70 | 18.0 | 0.30 | 0.12 | 12 | 45 | O | |
| 40 | 70 | 17.5 | 0.25 | 0.08 | 18 | 85 | O | |
| 41 | 70 | 17.0 | 0.20 | 0.07 | 20 | 110 | O | |
| 42 | 70 | 15.5 | 0.25 | 0.10 | 15 | 25 | Δ | Control |
| 43 | 65 | 15.5 | 0.25 | 0.08 | 35 | 140 | Δ | |

*Evaluation
O; Good
Δ; Fair
X; Bad

What is claimed is:

1. An aluminum alloy composite material for brazing, comprising:
 a core member having two surfaces made of aluminum alloy, the content of Mg being restricted to 0.2% or less by weight as an impurity;
 an Al-Si member clad on one surface of said core member; and
 a supplying member made of aluminum alloy consisting essentially of 0.3% to 2.5% by weight of Mg and clad on the opposite surface of said core member.

2. The aluminum alloy composite material according to claim 1, wherein said aluminum alloy of said core member consists essentially of 0.2% to 1.5% by weight of Mn, the content of Mg being restricted to 0.1% or less by weight.

3. The aluminum alloy composite material according to claim 2, wherein said aluminum alloy of said core member consists essentially of one or more elements selected from the group consisting of 0.5% or less of Cu, 0.3% or less of Cr, and 0.2% or less of Zr, all by weight.

4. The aluminum alloy composite material according to claim 1, wherein said aluminum alloy of said core member consists essentially of 0.2% to 1.5% of Mn and 0.3% to 1.3% of Si, both by weight, the content of Mg being restricted to 0.2% or less by weight.

5. The aluminum alloy composite material according to claim 4, wherein said aluminum alloy of said core member consists essentially of one or more elements selected from the group consisting of 0.5% or less of Cu, 0.3% or less of Cr, and 0.2% or less of Zr, all by weight.

6. The aluminum alloy composite material according to claim 1, wherein said aluminum alloy of said supplying member consists essentially of 0.3% to 2.5% of Mg and 2% or less of Zn, both by weight.

7. The aluminum alloy composite material according to claim 1, wherein said aluminum alloy of said supplying member consists essentially of 0.3% to 2.5% of Mg and 0.2% to 1.5% of Mn, both by weight.

8. The aluminum alloy composite material according to claim 7, wherein said aluminum alloy of said supplying member consists essentially of one or more elements selected from the group consisting of 0.5% or less of Cu, 0.3% or less of Cr, and 0.2% or less of Zr, all by weight.

9. The aluminum alloy composite material according to claim 1, wherein said core member has a thickness 2.5 times or more greater than that of said filler member and falling within a range of 0.1 to 1 mm.

10. A tube member for a radiator, which is assembled by the Nocolok brazing method using the aluminum alloy composite material for brazing which comprises a central member having two surfaces and being made of aluminum alloy, the content of Mg being restricted to 0.2% or less by weight as an impurity; an Al-Si member clad on one surface of said central member; and a supplying member made of aluminum allow consisting essentially of 0.3% to 2.5% by weight of Mg and clad on the opposite surface of said central member.

11. The tube member according to claim 10, which is fabricated into a tube with said Al-Si member outside, by seam welding.

12. The tube member according to claim 10, wherein, after the Nocolok brazing process, the pitting potential of said central member (positive) is higher than that of said supplying member (negative), and the difference in pitting potential between said central member and said supplying member is 30 to 120 mV.

* * * * *